May 13, 1941. R. B. BAWTENHEIMER 2,241,898
BUILDING FACING
Filed Nov. 3, 1938    3 Sheets-Sheet 1
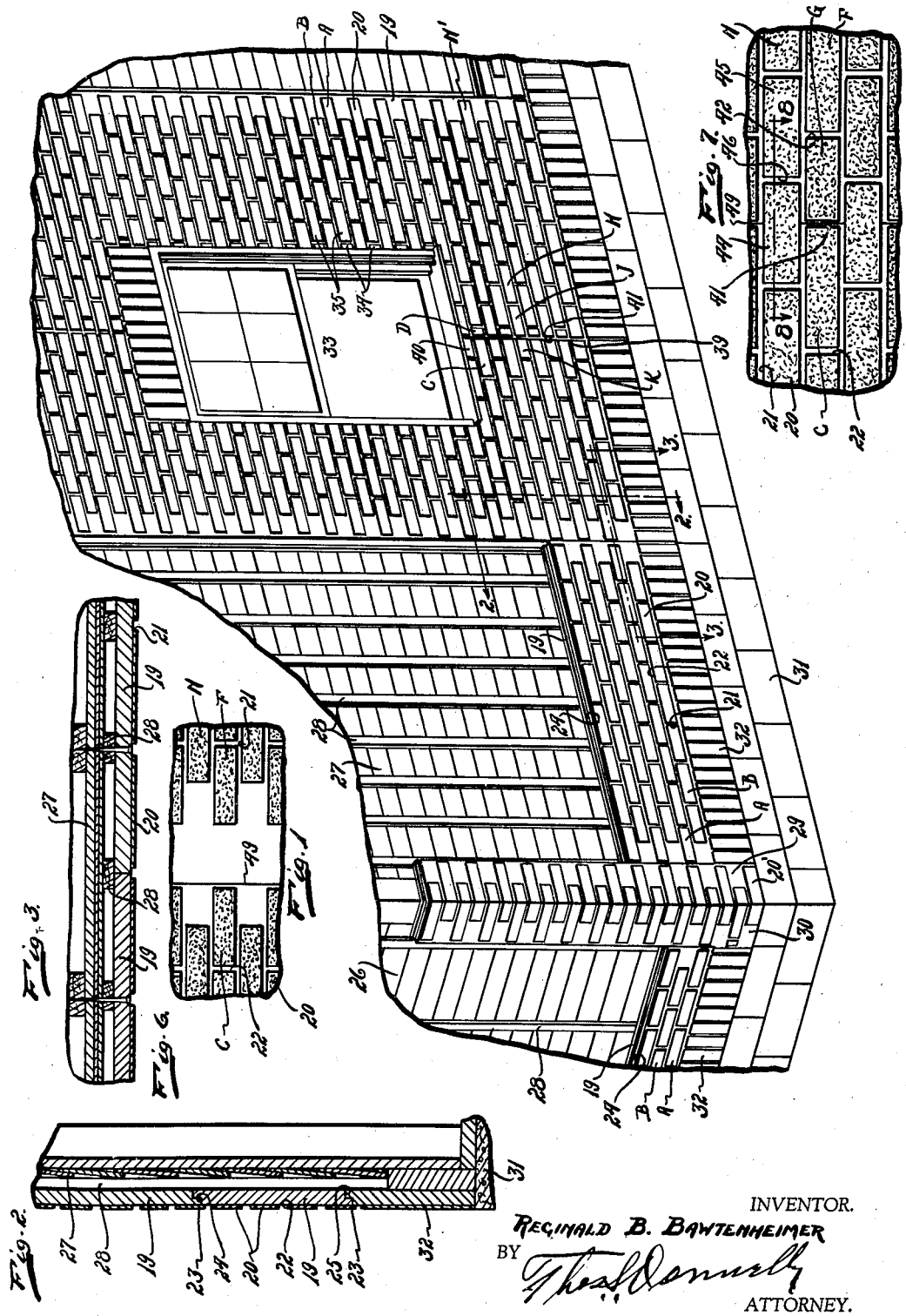
INVENTOR.
REGINALD B. BAWTENHEIMER
BY
ATTORNEY.

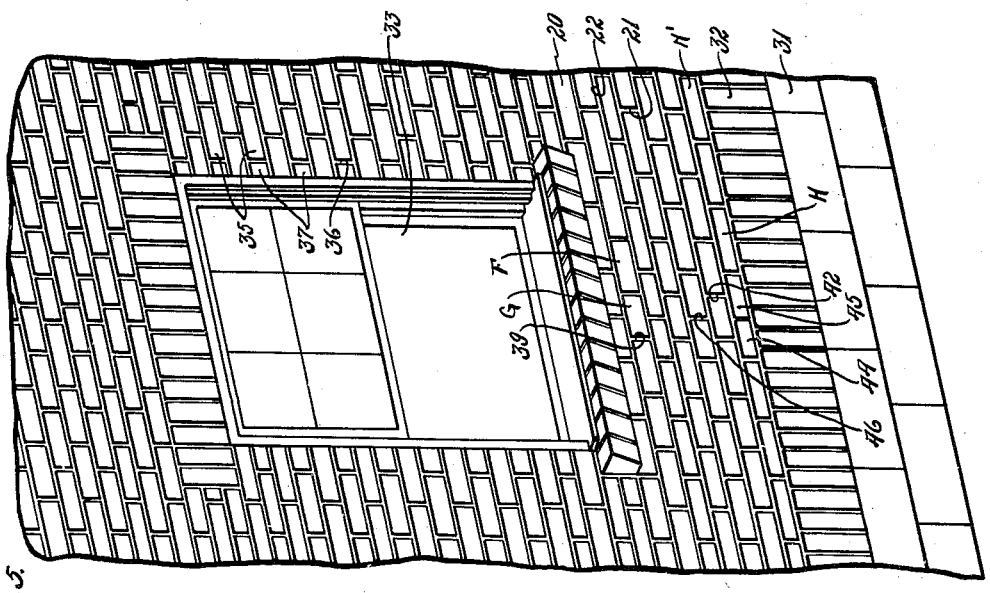
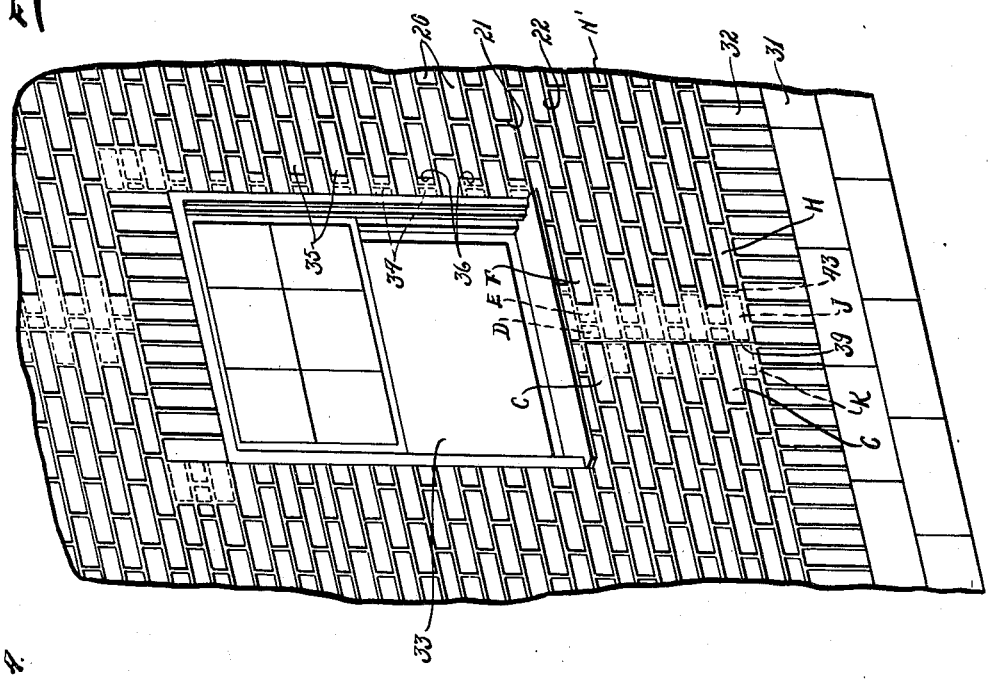

May 13, 1941. R. B. BAWTENHEIMER 2,241,898
BUILDING FACING
Filed Nov. 3, 1938 3 Sheets-Sheet 3
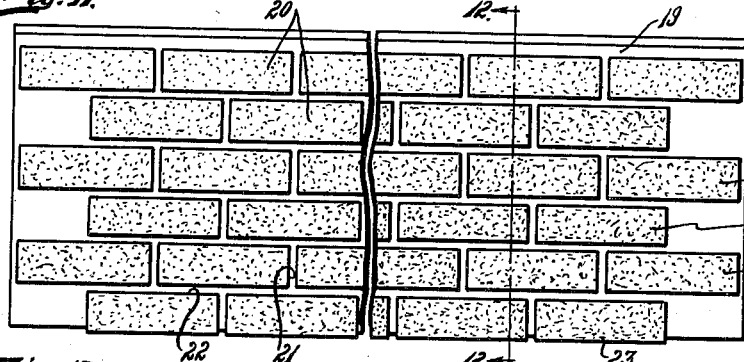
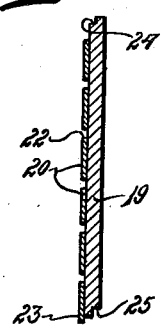
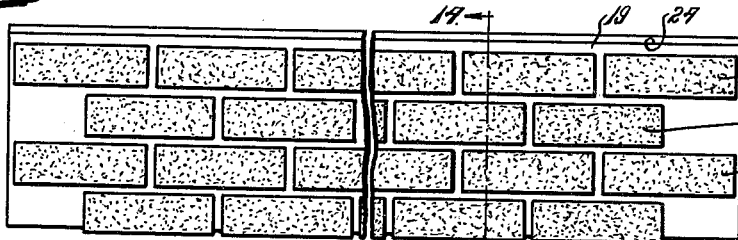
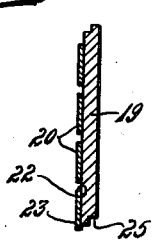
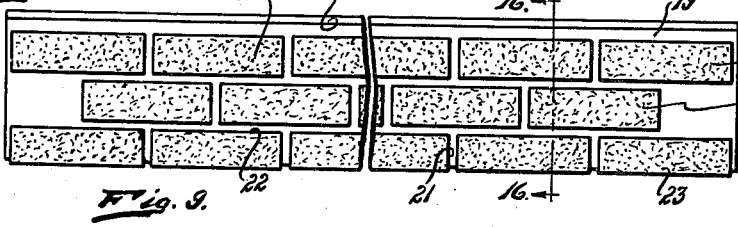
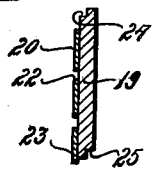
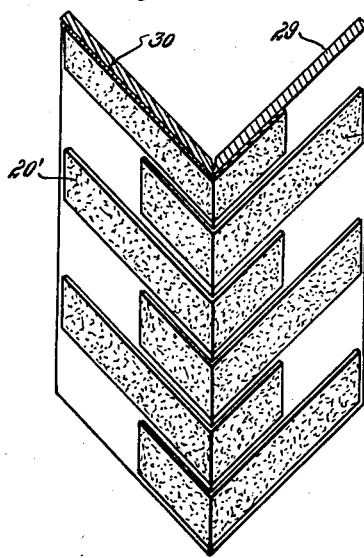
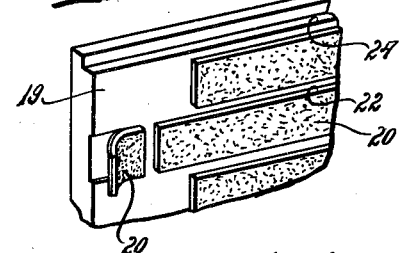
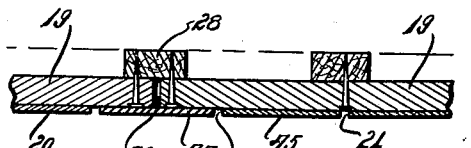
INVENTOR.
REGINALD B. BAWTENHEIMER
BY
ATTORNEY.

Patented May 13, 1941

2,241,898

UNITED STATES PATENT OFFICE 2,241,898

BUILDING FACING

Reginald B. Bawtenheimer, Sarnia, Ontario, Canada, assignor to Charles Weir, Sarnia, Ontario, Canada Application November 3, 1938, Serial No. 238,641

7 Claims. (Cl. 20—5)

My invention relates to a new and useful improvement in a building facing and embodies the facing itself, the method of mounting and the structure resulting from the following of the method in the use of the facing described.

This application constitutes a continuation in part of my copending application Serial Number 34,143, filed August 1, 1935, in which is covered primarily the bonding of the pattern-forming strips to the supporting board.

Reference is also made to my copending application Serial Number 224,346, filed August 11, 1938, in which the construction of the corner piece shown in Fig. 9 is covered.

The invention is used for forming the outer surface or facing of buildings and may be utilized in new constructions or in covering the outer surfaces of buildings already constructed.

I am aware that various types of facings for the purposes referred to have been produced but the present invention has many advantages over those which are known to me. Such facings generally carry on their outer surface an ornamentation resembling a type of construction and very frequently resembling a brick, block or stone construction. It is desired in the use of such facings that when the building is faced with the facing, the simulation shall be free from defects or departures from the type of construction simulated. It is difficult with usual types of facing to maintain the simulation at all parts of the surface and the present type of facing is arranged and constructed for the purposes of maintaining the accurate simulation at all parts of the building and it is an object of the present invention to provide a facing so arranged and constructed and a method of assembling the same that will permit an accurate simulation of the same without defects and marrings in appearance.

The facing is usually constructed in panels of a certain length and the ornamental ornament-forming parts extend from end to end of the panel and are arranged to match and cooperate with the ornamentation on adjacent panels. In mounting the facing on buildings, this matching and cooperation will be perfect when the building is of such a size that panels of full length may be used. This, however, is very rare and where it is necessary to cut one of the panels to a shorter length, the ornamentation on the outer surface of the panel will, of course, also be cut thus presenting a defect or unnatural appearance in the block or brick construction simulated. In practice I have found that in facing a building a satisfactory method of procedure is to build inwardly from opposite ends of the building toward the center so that if cutting of the panels becomes necessary, two of the panels may be cut or if one of the panels is cut the ornament-forming parts on adjacent panels on the cut portion may be removed and individually cut to bring out the simulated construction. I have also found that it is preferable to have the cut panels abut below a window or similar construction so that if there is any slight defect in appearance after the construction is finished, it will be in a less noticeable place. It is an object of the present invention to provide a construction and method of mounting whereby this uniform simulation may be maintained throughout the entire construction.

In assembling the siding it is sometimes necessary, for the purposes of properly aligning the facing, to use nailing strips positioned between the walls of the construction and the facing and it is an object of the present invention to provide a method of mounting in which the aligning may be effected by the use of such nailing strips and whereby an air space may be provided between the construction and the facing for the purposes of insulation.

It is another object of the invention to provide a facing so constructed and arranged in a plurality of cooperating panels which will lend itself to the most economical use.

Another object of the invention is the provision of a facing formed from panels so constructed and arranged that the meeting edges of the panels may be concealed.

Other objects will appear hereinafter.

The invention consists in the combination and arrangement of parts hereinafter described and claimed.

The invention will be best understood by a reference to the accompanying drawings which form a part of this specification, and in which, Fig. 1 is a fragmentary, perspective view of a building showing the invention applied, in unfinished form.

Fig. 2 is a fragmentary, sectional view taken on line 2—2 of Fig. 1.

Fig. 3 is a fragmentary, sectional view taken on line 3—3 of Fig. 1.

Fig. 4 is a fragmentary, perspective view of the wall shown in Fig. 1 illustrating the steps necessary for completion.

Fig. 5 is a fragmentary, perspective view of the wall shown in Fig. 1 in its completed form.

Fig. 6 and Fig. 7 are fragmentary, front elevational views slightly enlarged illustrating the method of construction.

Fig. 8 is a fragmentary, sectional view taken on line 8—8 of Fig. 7.

Fig. 9 is a fragmentary, perspective view of a corner piece used in the invention.

Fig. 10 is a perspective view of a panel fragment illustrating the removal of one of the strips therefrom.

Fig. 11 is a plan view of a panel with parts broken away.

Fig. 12 is a sectional view taken on line 12—12 of Fig. 11.

Fig. 13 is a plan view of another sized panel with a part broken away.

Fig. 14 is a sectional view taken on line 14—14 of Fig. 13.

Fig. 15 is a plan view of another sized panel with a part broken away.

Fig. 16 is a sectional view taken on line 16—16 of Fig. 15.

In the drawings I have illustrated the invention used on a facing having a pattern simulating a brick construction. This facing is formed from panels as indicated in Figs. 11, 13 and 15, these three types of panel being illustrated as they form a combination of panels with the use of which a most economical construction may be arrived at. The siding comprises a supporting body or base 19 and mounted on the outer surface of this panel 19 are strips 20 which serve to form the pattern. These strips are formed of the size of the brick or block which is being simulated and are spaced apart to provide the spaces 21 and 22 which simulate the mortar joint, the coloring of the members 20 and the face of the panel 19 being such as to give the desired simulation in color. The strips 20 are preferably formed from flexible material which may be cut such as a fibrous material saturated in asphalt or the like. These strips are adhesively mounted on the outer face of the panel 19 and, as clearly shown in the sectional views 12, 14 and 16, the strips along one of the longitudinal edges 23 of the panel overhang and at the opposite longitudinal edge they are set inwardly a distance equal to the width of the mortar joint plus the distance of overhanging at the opposite edge. These longitudinal edges are cut away on the upper edge as at 24 on the outer face thereof and at the lower edge on the inner face as at 25 to provide outwardly projecting tongues so that when the panels are placed in engaging relation at their longitudinal edges these tongues will overlie each other and thus the joint will be sealed. The overhanging edges of the lower row of strips 20 also extend across the joint at the meeting edges of the two panels.

The body 19 may be formed from any suitable material which may be sawed or cut but it is preferred to form the same from a ply-wood or a fibrous composition. When formed from a fibrous composition and it is desired to remove one of the strips 20 therefrom after it has been adhesively mounted thereon, it has been noted that with some fibrous compositions the outer layer of the body 19 tears off with the strip of a thickness about the same as an ordinary sheet of paper. This factor facilitates the removal and replacement of these strips on such a composition. This is so because over the area from which the strip is torn, there is placed a layer of adhesive and a new strip is laid thereon, the additional layer of adhesive compensating for the layer of material which has been torn away with the strip which was removed.

In Fig. 1 I have illustrated a part of a building having the side walls 26 and 27 over which the siding is to be mounted. Secured to these walls and extending vertically are the nailing and spacing strips 28 which are plumbed so that the facing attached thereto will extend vertically. The main body of the side walls is covered with the panels illustrated in Figs. 11, 13 and 15 and the formation of the panels of different widths and having varying number of courses thereon permits the adjustment of these panels as to height so that a minimum amount of altering of the panel from the condition in which it is manufactured is necessary. In the corner is mounted a corner piece which is illustrated in Fig. 9 and which embodies a supporting panel or base bent to provide the angularly extending portions 29 and 30 carrying the block or brick simulating strips 20' arranged to provide the proper corner effect. This corner piece of itself, however, forms no part of the present invention being set out in a separate co-pending application.

Secured to the side walls 27 and 28 by nails above the foundation wall 31 is a panel having the block or brick simulating strips so arranged as to provide a soldier course 32. The panels illustrated in Figs. 11, 13 and 15 are positioned above the soldier course abutting at one of their end edges against the corner piece. In laying the side panels, the corner pieces are mounted, the soldier course is placed in position and then the panels covering the side wall are attached to this side wall moving inwardly from these corner pieces toward the centre.

It will be noted that on the panels shown in Figs. 11, 13 and 15, one of the courses of strips such as the course A extends with a full length strip to a distance from the opposite edges of the panel equal to one-half the width of the mortar joint 21 and the adjacent layer or row B terminates inwardly from the opposite edges a distance equal to one-half the length of one of the strips 20 plus the width of the mortar joint 21. When the panels are abutted against each other, the layers A would be aligned with each other as would likewise the layers B thus leaving at the line of separation of the panels a blank space in each alternate row equal to the width of one of the strips 20 plus the width of the mortar lines. After the panels are erected, strips are then placed in these blank spaces so that these strips overlie the line of separation of the panels. It will be noted that this same arrangement is carried out in the corner piece and that proper alignment of the rows on the panel with the rows on the corner piece must be maintained. It is believed obvious that panels and corner pieces may be fabricated either right or left hand. The corner piece shown in Fig. 9 has been so fabricated as to constitute a left hand corner piece, that is, at the top the tab projects to the end of the left hand diagonally directed portion 30 and the bottom tab to the right. When the top tab 20 projects across the right hand diagonally directed portion 29 and the bottom tab projects to the left the corner piece would constitute a right hand corner piece. The panels shown in Figs. 11 and 13 properly co-operate with the left hand side of the illustrated left hand corner piece Fig. 9, and the panel shown in Fig. 15 with the right hand side of the illustrated left hand corner piece Fig. 9. The panel shown in Fig. 15 may be called a left hand or reverse bond panel. The bond at the corner decides the bond or reverse bond of the panel. The occasion for the use of a left or right hand corner piece is hereafter described. In actual construction left hand corner pieces can be converted on the job into right hand corner pieces by cutting off the bottom course of the lowest corner piece and lowering the corner pieces relatively to the panels to the proper co-operating aligning position, but it is desirable to have available a sufficient number of reverse bond panels.

As the panels are moved inwardly from the opposite corners it generally will be found necessary to cut the panels in order to fit and when so cut the bond may not match. If the length in inches of the wall 27 is evenly divisible by nine no difficulty will be encountered in matching. But should such division result in a remainder of less than 4½ inches the bond should be changed by using at one corner left hand corner pieces as illustrated in Fig. 9 and at the other corner right hand corner pieces. It is believed obvious that right hand corners may be used and the bond changed by the use of the oppositely bonded corner pieces on the other corner. When the remainder is 4½ inches or more than 4½ inches it is unnecessary to change the bond by the use of the oppositely bonded corner pieces. The panels are then applied working from each corner to the centre of the wall using right or left hand panels as the bond of the corner pieces dictates, the marginal blanks on the corner piece being opposite to the blanks B on the panel and the marginal strips on the corner piece aligning with the strips A on the panel. When the panels from the opposite ends of the wall meet some adjustment of the bond may be necessary. In Fig. 4 I have illustrated such a situation which I prefer to encounter beneath a window opening 33 or the like. Where adjustment in the bond is not made, the result would be very unsightly, as shown in Fig. 4, the simulation would be lost and the appearance marred due to the irregularity resulting from unstandard sized pieces accentuated by a vertical mortar line. To overcome the difficulty and to provide a construction in which the irregularity will be reduced to a minimum, the short pieces at the end of the panel and part of the full length strip adjacent to them in the same course are cut off. These parts and the adjacent short pieces in the same row are removed thus providing larger empty spaces than would be provided were only the short pieces removed.

In Fig. 1 I have illustrated a construction embodying the invention in which the irregularities in matching which may be encountered in the use of a facing are displayed. These irregularities are noticeable below the centre of the window 33. When the panel is cut to fit, these irregularities sometimes occur and, as shown in Fig. 1, the end strips toward the bottom of the window are narrower than at the top, this feature being frequently encountered due to improper alignment of openings and other parts of a building. The portions 34 are considerably less than one-half of the size of one of the strips 20 so that they do not resemble a brick placed endwise in the construction. With the portions 34 present, the simulation is destroyed as this type of construction would not be encountered in a real brick construction. The same irregularities also appear immediately below the centre of the window 33.

In Fig. 4 I have illustrated the same construction and by dotted lines I have indicated how the strips or tabs are to be cut off to provide larger blank spaces in which new tabs will be placed so as to break the vertically extending joint.

In Fig. 5 I have shown the completed construction with the changes made thus indicating how the simulating effect is carried out. At the right of the window a portion is cut off of the strips 35 and removed together with the portions 34 of these strips thus establishing a mortar line 36 which is in vertical alignment and providing a larger blank space in which a portion of a strip or tab 20 closely approaching in dimensions the end face of a brick is provided. Placed in this blank is a portion 37 of a strip to provide the construction illustrated in Fig. 5. It will thus be noted that while the blocks 35 have been slightly reduced in length, the difference in length would not be ordinarily noticeable without a close inspection and the simulating effect desired thus effected. This matching or method of maintaining the simulation consists in, after the panels have been cut to the desired size and the matching is not present because of some of the strips being cut into less than half their size, removing a portion of the full size strips which are adjacent the small cuts of the strips and removing the small cuts of the strips to provide a blank space for the reception of a strip approximating in size one-half of the normal size strip and placing a strip in the blank space so provided while at the same time maintaining the mortar line between the substituted pieces and the strips from which a part have been cut in vertical alignment.

This same method is followed to correct the imperfection in matching which appears immediately below the window. As shown in Fig. 1, the panels are abutted at the line 39 and one of the panels ends with the small strips 40. As shown in Fig. 4, one of the panels in one of the rows ends with a full-size strip or block C and the abutting panel ends with the portion D which is less than half of a full-size strip. Were this to be left in this manner, the joint would constitute an uninterruped mortar line 41 spaced therefrom less than a distance of half of one of the strips 20. The portion D is removed and a portion E of the strip F is also removed to provide a space in which a strip G approximating in size one-half the size of an ordinary strip is inserted thus forming a mortar line 42 which is parallel to and spaced from the mortar line 39 a greater distance than would be the mortar line shown in Fig. 4.

In the row below it is desired that the mortar line or joint 39 be broken by an overlapping strip and a portion 43 of the strip or block H is removed as well as the strip J and on the abutting panel the strip K is removed to provide a large blank space nearly equal to the space occupied by two full-size strips and in this blank space the strips 44 and 45 are inserted establishing the mortar line 46. In the next lower row a portion 47 of the strip or block L is removed as well as the cut portion 48 and in this space is inserted the block M. It is believed that the method of matching resulting from cutting back and removing and substituting strips in order to complete the structure below the window will be obvious from the description so far given and from an examination of Figs. 1, 4 and 5.

This method of construction is illustrated on a somewhat larger scale in Figs. 6 and 7. In these views the panels are abutted together at the line 49 and the row N in Fig. 6 may be said to present the same problem which is encountered in the row N in Fig. 4. In Fig. 7 the row N shows the finished construction and the two lower rows correspond to the two lower rows shown in Fig. 4. In Fig. 4 at the upper corner of the window, in order to continue the soldier course beyond the edges of the window, it is necessary that the strips shown in dotted lines in Fig. 4 be removed and replaced with the vertically extending strips shown in Fig. 5.

The method of erecting the sliding is important for the economic use of the same and for bringing into operation the various features which have been enumerated. To begin with, a starting line is determined by measuring downwardly from the underside of the eaves at each corner in order to establish the lowest corner so that the rows of strips may be extended horizontally. All corners will then be measured this dimension thus determining the starting line at all corners. At any corner a corner piece is nailed securely. At the corner opposite this corner piece another corner piece is temporarily nailed in position and the distance between these corner pieces is measured to determine whether or not the correct matching or bond may be accomplished. It is believed obvious that the strips which are used for simulating the pattern imitated may be of any desired width or length and the remarks directed to strips 9" long are equally applicable to strips of other lengths. The remarks directed to pieces of strips 4½" in length merely refer to a portion of a strip one-half of the original length as the width and length of these strips may vary depending upon the pattern desired to be formed or the block or brick simulated. If the distance between the inside vertical edges of the lowest bricks on the two corners is such as to be a multiple of 9" or the length of one brick and joint whatever that length may be, or not under a half length, both corner pieces will be applied on the same level. The reason for this is believed obvious from the description given. If the distance measures out so that less than half a brick will be needed the bond of the corner piece which is temporarily nailed will be changed by the use of an oppositely bonded corner or by lowering and cutting off one course from the lower end thereof as previously described. All the walls are started in the same manner. It is believed obvious that failure to correct the bond of corner pieces in the manner previously described may be overcome by the use of the appropriate bond or reverse bond panels. A line is then pulled from corner to corner in the top of the third course of both corner pieces and then the soldier course is applied, starting from any end and continuing to the opposite end. This soldier course is formed on a panel similar to the panels shown in Figs. 11 to 15, inclusive, excepting that the strips extend transversely of the supporting board or bracing seat. If the bricks in the soldier course do not come out as even bricks when applied, the board is cut to the correct length to fit which would leave a narrow brick at the end of the soldier course. This narrow strip would be removed and sufficient bricks cut back in order to get a complete brick at the end of the soldier course. If a door or other opening occurs along the soldier course in applying the facing the work is proceeded from either side of the opening and directed toward the corner. On wide corners, a narrow terminal brick on the soldier course panel will be left without any change.

After laying the soldier course, the wall panels are applied. In the drawings I have illustrated three types of wall panels which have proven most economical and practical in actual construction. This illustration is made, however, only for example as panels of various numbers of courses or rows may be fabricated if desired. When the three sheets illustrated in the drawings are present on the job, the erector would select a 6, 4 or 3 course panel whichever is most adaptable. This will be determined by making certain that the blank squares of the panel piece and the blanks on the opposite piece are opposite each other. The panel pieces are applied by starting from both ends and preferably meet under the window near one of the corners. The meeting in the panel piece must occur at a furring piece so that both ends can be securely nailed. If the bricks do not come out even, then the bond or vertical joint in the courses will be adjusted as mentioned.

In the various types of structure, the cutting back and removing of facing strips may be easily and quickly effected and by providing a facing having the strips so arranged and constructed that they may be removed or that a portion thereof may be cut off and removed, it becomes possible in a construction of this type to provide a perfect matching and maintain a substantially perfect simulation throughout the building regardless of variations and ornamentations which may be found on the building.

When the panels are brought together to abut at their edges, these edges are sealed by forcing a sealing substance between the same, this substance being preferably asphalt reduced to a softened form. In any event, it is preferable that the sealing substance be such that it congeals and hardens at ordinary temperatures and will be softened and liquified at higher temperatures. The edge surfaces of the panels also carry a layer of plastic or sealing material so that the amount of sealing material added to the abutting panels is thus reduced.

It is believed obvious that the meeting edges of the panels may be provided with a tongue and groove connection if desired or they may be overlapped so as to obviate the use of the sealing substance referred to.

The use of the spacing or nailing strips 28 which may be termed furring strips, makes it possible to erect the facing properly aligned as the furring or spacing strips may be shimmed at desired points so that they are erected plumb and thus a plumb body for supporting the facing construction is afforded.

With this type of facing a construction is provided which lends itself to all types of construction and accommodates itself to various formations in buildings such as bay windows, arches, and the like making it possible to completely face a building in such a manner that it is very difficult to distinguish the same from a real brick construction. It is, of course, necessary that the outer face of the tabs or stripes 30 as well as the exposed portions of the panel body or base 19 be properly colored to imitate the type of building block or brick simulated. This is accomplished by facing the outer face of the tabs or strips 20 with fine granules which are caused to adhere thereto by suitable adhesive. The outer face of the supporting base or panel 19 is also covered with graphite or other suitable powder-like substance which adheres to the asphalt adhesive with which the outer face of the base 19 is saturated.

In this way I have provided a method of construction and a facing whereby a most satisfactory and efficient construction job becomes possible with all of the desired effects of such a facing.

While I have illustrated and described the preferred forms of construction, I do not wish to limit myself to the precise details of structure shown, but desire to avail myself of such variations and modifications as may come within the scope of the appended claims.

What I claim as new is:

1. The method of facing a building with a facing of panels having registering rows of individual pattern-forming strips separate from and mounted on the outer face of said panels, consisting in: cutting said panels to the length desired, abutting adjacent panels together at their end edges, removing pattern-forming strips cut to a length less than half their normal length to provide a strip-receiving blank, cutting off and removing a portion of the strip adjacent said blank for enlarging said blank and filling said blank with a separate strip.

2. The method of facing a building with a facing of panels having registering rows of individual pattern forming strips separate from and mounted on the outer face of said panels, consisting in: cutting said panels to the length desired, abutting adjacent panels together at their end edges, removing pattern-forming strips cut to a length less than half their normal length to provide a strip-receiving blank, cutting off and removing a portion of the strip adjacent said blank for enlarging said blank and filling said blank with a separate strip approximating in size a full-size strip or one one-half the size thereof.

3. The method of facing a building with a facing of panels having registering rows of individual pattern-forming strips separate from and mounted on the outer face of said panels, consisting in: cutting said panels to the size desired, securing said panels on the building to be faced with adjacent panels abutting against each other at their end edges, removing pattern-forming strips mutilated in the cutting operation to provide a strip-receiving blank, enlarging said blank by cutting off a portion of the adjacent strip and mounting in said blank a separate strip spaced from the adjacent strips to provide mortar line simulations.

4. The method of facing a building with a facing of panels having registering rows of individual pattern-forming strips separate from and mounted on the outer face of said panels, consisting in: mounting on said building to be faced, furring strips, cutting said panels to the desired length, mounting said panels on said furring strips for encasing said building and abutting adjacent panels together at their end edges, sealing the crevice between abutting end edges with a suitable sealing means, removing mutilated pattern forming strips to provide a strip-receiving blank, enlarging said blank by cutting back and removing a portion of the adjacent strip and filling the blank so formed by securing a strip therein.

5. The method of facing a building with a facing of panels having registering rows of individual pattern-forming strips separate from and mounted on the outer face of said panels, consisting in: mounting on said building to be faced furring strips, cutting said panels to the desired length, mounting said panels on said furring strips for encasing said building and abutting adjacent panels together at their end edges, sealing the crevice between abutting end edges with a suitable sealing means, removing mutilated pattern-forming strips to provide a strip-receiving blank, enlarging said blank by cutting back and removing a portion of the adjacent strip and filling the blank so formed by securing a strip therein in spaced relation to adjacent strips.

6. The method of facing a building with a facing of panels having registering rows of individual pattern-forming strips separate from and mounted on the outer face of said panels, consisting in: cutting said panels to the desired length, mounting said panels on the building to be faced, removing the strips mutilated in the cutting operation to provide a blank space on the face of said panels, removing a sufficient portion of the pattern-forming strip adjacent said blank space for enlarging the same sufficiently for reception of a pattern-forming strip sufficiently large for continuing the pattern formation and securing in said blank space in spaced relation to surrounding strips a pattern-forming strip for completing the formation.

7. The method of matching the pattern formation on abutting facing panels having individual pattern-forming strips on the outer face thereof consisting in: removing the portions of strips out of match with the pattern on said panels to provide a blank space for the reception of a separate strip, enlarging said blank space at its ends by removing a sufficient portion of the end of the adjacent strip for enlarging said blank space to a size for the reception of a pattern-matching strip and mounting said pattern-matching strip in said blank space.

REGINALD B. BAWTENHEIMER.